US008127321B2

(12) United States Patent
Bammert

(10) Patent No.: US 8,127,321 B2
(45) Date of Patent: Feb. 28, 2012

(54) SUSPENSION ARM ACTUATOR FOR A SCANNING DEVICE INCLUDING A PRINTED COIL HAVING A PLURALITY OF LAYERS

(75) Inventor: Michael Bammert, Hardt (DE)

(73) Assignee: Thomson Licensing, Issy-les-Moulineaux (FR)

( * ) Notice: Subject to any disclaimer, the term of this patent is extended or adjusted under 35 U.S.C. 154(b) by 533 days.

(21) Appl. No.: 12/315,468

(22) Filed: Dec. 3, 2008

(65) Prior Publication Data

US 2009/0161498 A1 Jun. 25, 2009

(30) Foreign Application Priority Data

Dec. 21, 2007 (EP) .................................... 07123955

(51) Int. Cl.
*G11B 11/00* (2006.01)
(52) U.S. Cl. ........................................ 720/672; 369/300
(58) Field of Classification Search .................. 369/13.2, 369/13.11, 13.12, 13.21, 300; 360/245, 245.1, 360/245.2, 245.3, 245.4, 245.5, 245.6, 245.7, 360/245.8, 245.9; 720/672, 673, 674, 683, 720/685
See application file for complete search history.

(56) References Cited

U.S. PATENT DOCUMENTS

| 6,243,236 | B1 * | 6/2001 | Yamamoto et al. | 360/245.9 |
| 6,388,840 | B1 * | 5/2002 | Ohwe | 360/244.1 |
| 6,785,201 | B2 * | 8/2004 | Shinohara et al. | 369/44.17 |
| 6,826,016 | B2 * | 11/2004 | Katsumata | 360/245.9 |
| 6,847,591 | B1 * | 1/2005 | Murakami et al. | 369/13.2 |
| 2001/0055264 | A1 * | 12/2001 | Cheong et al. | 369/112.23 |
| 2002/0024919 | A1 * | 2/2002 | Lee et al. | 369/112.24 |
| 2004/0148619 | A1 | 7/2004 | Kim et al. | |
| 2008/0298218 | A1 * | 12/2008 | Tanaka et al. | 369/126 |
| 2009/0070795 | A1 * | 3/2009 | Bammert et al. | 720/672 |
| 2009/0249380 | A1 * | 10/2009 | Bammert et al. | 720/672 |

FOREIGN PATENT DOCUMENTS

WO 2007131877 11/2007

OTHER PUBLICATIONS

Search Report dated May 19, 2008.

* cited by examiner

*Primary Examiner* — Tan X Dinh
(74) *Attorney, Agent, or Firm* — Myers Wolin, LLC

(57) ABSTRACT

The invention relates to a suspension arm comprising a suspension arm designed as a two-arm lever, said suspension arm mounted to a support such that it can be pivoted between the lever arms about an axis extending perpendicularly to said suspension arm. One of the lever arms supports on its end side an optical head having a focal lens and comprises an elastic region for initiating a motion of the optical head in focusing direction perpendicularly to the pivot plane of the suspension arm. The other lever arm is provided with a coil of a magnetic drive for initiating a swivel motion about the axis. In addition, the suspension arm actuator comprises a magnetic drive for initiating the motion of the optical head in the focusing direction. It solves the problem of designing such a suspension arm actuator such that the sensitivity of said suspension arm actuator is increased. To achieve this, at least one of the magnetic drives is designed with at least one printed coil which is provided with at least one layer increasing the magnetic field strength.

12 Claims, 2 Drawing Sheets

SUSPENSION ARM ACTUATOR FOR A SCANNING DEVICE INCLUDING A PRINTED COIL HAVING A PLURALITY OF LAYERS

TECHNICAL FIELD OF THE INVENTION

This application claims the benefit, under 35 U.S.C. §119 of EP Patent Application 07123955.2 filed Dec. 21, 2007.

The invention relates to a suspension arm actuator for a scanning device with a scanning head, in particular with an optical head comprising a focal lens, to be preferably arranged in a device for recording and/or reproducing information.

BACKGROUND

An actuator arranged in an optical scanning device and comprising an optical head having a focal lens is intended for emission of a light beam, in particular of a laser beam, onto an optical disk designed as an information carrier and for reception of the beam reflected by said optical disk. Therein, the optical disk is held by a supporting device and is caused to make a rotational motion. The actuator can be designed as a two-arm suspension arm actuator with the optical head being arranged at a free end thereof. The suspension arm can be pivoted about an axis and moves the end with the optical head in the form of an arc in a plane extending in parallel to the recording surface of the optical disk, tracking plane, and can be focused with its head perpendicularly to this plane, focusing plane. A suspension arm actuator allows achieving fast access to various locations on the recording carrier.

For example, such a suspension arm actuator is described in US 2004/0148619 A1. The suspension arm actuator described there is arranged on a support such that it can be pivoted about an axis and, to achieve this, comprises a magnetic drive at its end region that is arranged opposite to the optical head, said magnetic drive being formed of a magnetic arrangement permanently arranged on the support and of a coil arranged on the suspension arm, with the operating current of said coil being controlled. On the pivot axis side facing away from the magnetic drive, that is on the side of the focal lens, the suspension arm comprises an elastic region with a leaf spring arrangement, which supports the optical head at its free end. A second magnetic drive formed with the suspension arm is allocated to said elastic region on the head side thereof, said elastic region being partially enclosed by the remaining suspension arm and said second magnetic drive being able to move said free end and, thus, the head in focusing direction. This is to disadvantage in that the head-sided part of the suspension arm is intense in weight, with the result that a swivel motion of the suspension arm about the axis is accompanied by an increased inertia thereof.

BRIEF SUMMARY OF THE INVENTION

The suspension arm actuator for a scanning device comprises a suspension arm which is designed as a lever and is mounted to a support such that it can be pivoted about an axis extending perpendicularly to said lever and further comprises a magnetic drive for initiating a motion of the suspension arm, with the lever supporting a scanning head. The magnetic drive is designed with at least one printed coil which is provided with at least one layer increasing the magnetic field strength.

In a preferred exemplary embodiment, the suspension arm of the suspension arm actuator is designed as a two-arm lever which is mounted to a support such that it can be pivoted about the axis extending perpendicularly thereto, wherein the scanning head is an optical head having a focal lens. Coils cooperating with the magnets arranged on the support and each forming a magnetic drive are arranged on one of the lever arms of the suspension arm, one for initiating a swivel motion of the optical head about the axis, in tracking direction, and one for initiating a motion of said optical head perpendicularly to this pivot plane, in focusing direction. At least one of the coils forming the magnetic drives, in particular for initiating the swivel motion about the axis, that is a tracking motion, is designed as a printed coil which is provided with at least one layer increasing the magnetic field strength.

This results in a suspension arm actuator which is reduced in weight, wherein the strength of the magnetic field of the coil is, in addition, increased, this having the effect of considerably increasing the sensitivity of the suspension arm. Such a layer can be easily applied during the manufacturing process of the printed coil, by using a coating method that is common in the microelectronics technology. A suspension arm actuator designed in this manner can access various locations on a recording carrier within considerably reduced times.

The coil is, in particular, designed with a plurality of layers and comprises between each of said layers one layer increasing the magnetic field strength. Preferably, however, these layers are only formed in those regions of the coil that are responsible for the magnetic drive. Where the tracking coil, which initiates the swivel motion of the suspension arm about the axis and which comprises two phase windings aligned radially in relation to the pivot axis and two phase windings arranged coaxially in relation to the pivot axis, is concerned, these regions are formed by the radially aligned phase windings. A further increase in the sensitivity of the suspension arm actuator, associated with reduced times of access to various locations on the particular recording carrier, is achieved by arranging a plurality of tracking coils adjacent to each other, with the result that an increased number of radially aligned phase windings is provided.

A further reduction in weight on the suspension arm is achieved by allocating the magnetic drive for initiating the motion of the optical head in focusing direction to the lever arm that supports the tracking coil. Therein, the coil for initiating the focusing direction, that is the focus coil, can also be provided with at least one layer increasing the magnetic field strength. As seen from the top view of the suspension arm, the focus coil is, therein, surrounded by a recess having the shape of a circular arc and intended for the leg of a yoke which is U-shaped in cross-section and is connected to a magnet. In this focus coil, the curved phase windings are responsible for the magnetic drive and the focusing motion, so that said focus coil can be provided with a layer increasing the magnetic field strength or, if it is designed with a plurality of layers, said coil can be provided with a plurality of layers increasing the magnetic field strength.

The at least one layer increasing the magnetic field strength can be made of a ferromagnetic material, for example of a ferrite.

BRIEF DESCRIPTION OF THE DRAWINGS

The invention will be illustrated below in more detail by means of an exemplary embodiment. In the associated drawings.

DETAILED DESCRIPTION OF PREFERRED EMBODIMENTS

Figure 1:
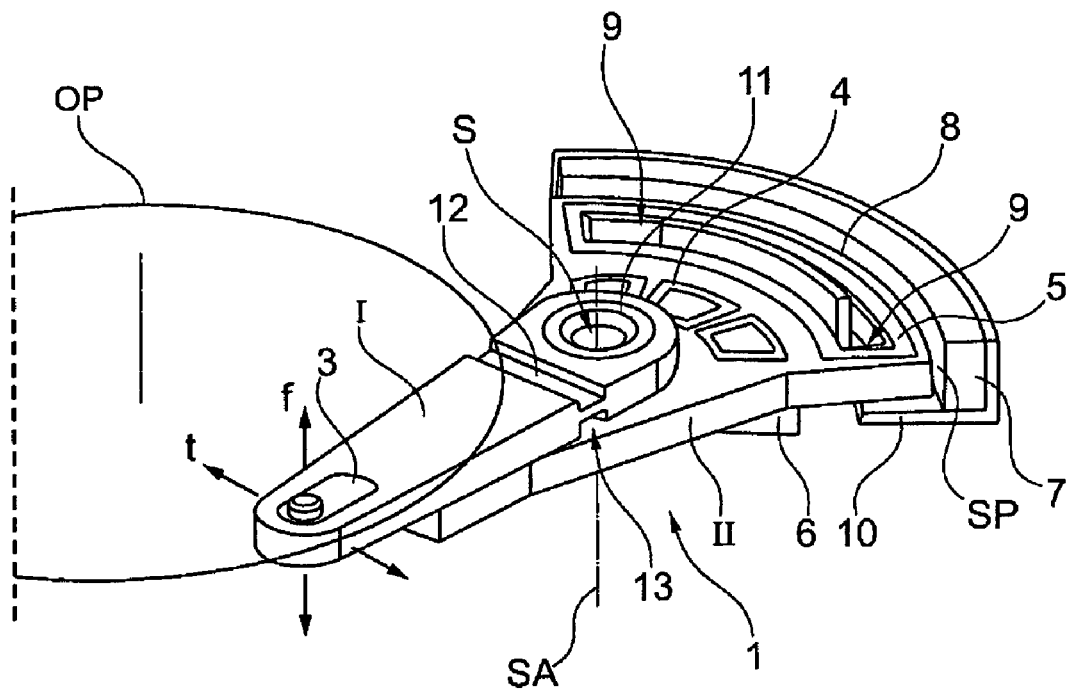
FIG. 1 is a top view of a suspension arm actuator with a coil and magnet arrangement, in perspective.
Figure 4:
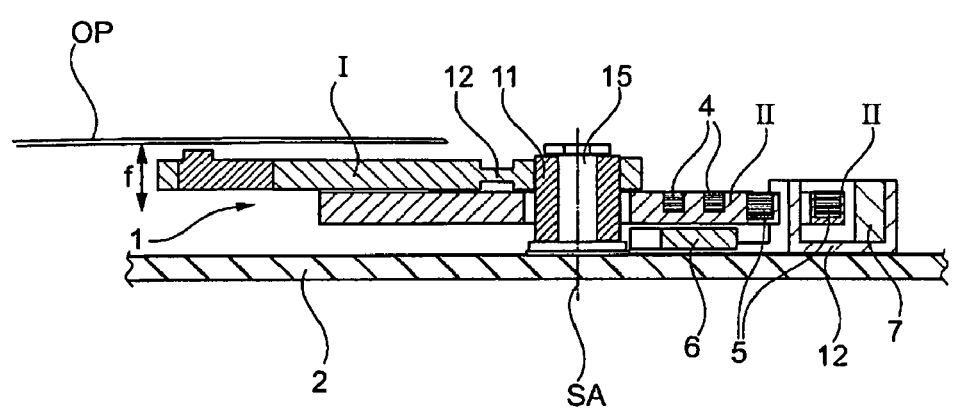
FIG. 4 is a longitudinal sectional view of the suspension arm actuator on a support.

The suspension arm actuator shown in FIG. 1, which is provided for an optical scanning device (not illustrated), comprises a torsionally stiff suspension arm 1 which is designed in the form of a two-arm lever and, in its center of gravity CG between the lever arms I and II, is mounted to a support 2, shown in FIG. 4, such that it can be pivoted about a pivot axis SA extending perpendicularly to the suspension arm 1. On its end side, the lever arm I supports an optical head 3 having a focal lens. Multi-layer printed coils 4 and 5 which are each formed of two phase windings aligned radially in relation to the pivot axis SA and two phase windings aligned coaxially in relation thereto, pivot axis SA, are integrated in the other lever arm II. The coils 4 and 5 are operably connected to the magnets 6 and 7 which are permanently attached to the support and are allocated to said coils 4 and 5 and form magnetic drives for the suspension arm 1 by means of these magnets 6, 7. OP indicates an optical disk to which the optical head 3 is allocated.

This lever arm II comprises an edge region 8 extending coaxially in relation to the pivot axis and having a coaxially designed recess 9 which is spaced apart from said edge region 8 and surrounded by the printed coil 5 on the upper and lower sides each. A leg of a U-shaped yoke 10 that is connected to the magnet 7 engages the recess 9 in a non-contacting manner, wherein the magnet 7 itself encloses the edge region 8 coaxially on the outside thereof with play SP. The magnetic drive formed in this manner initiates a motion of the suspension arm 1 perpendicular to the pivot plane in focusing direction f.

In the region between this first magnetic drive and the pivot axis SA, the magnet 6 which has the shape of a ring segment and is permanently attached to the support is arranged coaxially in relation to the pivot axis SA and spaced apart from the suspension arm 1. The coils 4 are allocated to this magnet 6. The magnetic drive formed of these coils 4 and the magnet 6 serves to generate a swivel motion of the suspension arm 1 about the pivot axis SA, in particular about a tracking motion in tracking direction t radially in relation to the optical disk OP.

The lever arm I supporting the optical head 3 is non-rotatably connected to a bearing bush 11 and comprises an elastically bendable region 12 for moving this head 3 in the focusing direction f perpendicularly to the pivot plane. The lever arm II is securely connected to this lever arm I in the region between the optical head 3 and the region 12 and held exclusively in this region and is, thus, freely suspended all the way to its edge region 8 on that side of the bendable region 12 that is facing away from the optical head. Owing to a groove 13 that is incorporated on the lower side and the upper side of the lever arm I, the region 12 is considerably reduced as compared to the thickness of this lever arm I, therein being designed in thickness such that the head-sided part of the otherwise rigid lever arm I is moved in focusing direction f once the lever arm II is subjected to the first magnetic drive formed with the magnet 7. The swivel motion of the lever arm I about the pivot axis SA is also initiated owing to the secure connection between the two lever arms I and II, said swivel motion of the lever arm I resulting from a swivel motion of the lever arm II which is initiated by the second magnetic drive formed with the magnet 6; this, in turn, initiates a swivel motion of the suspension arm 1.

Figure 2:
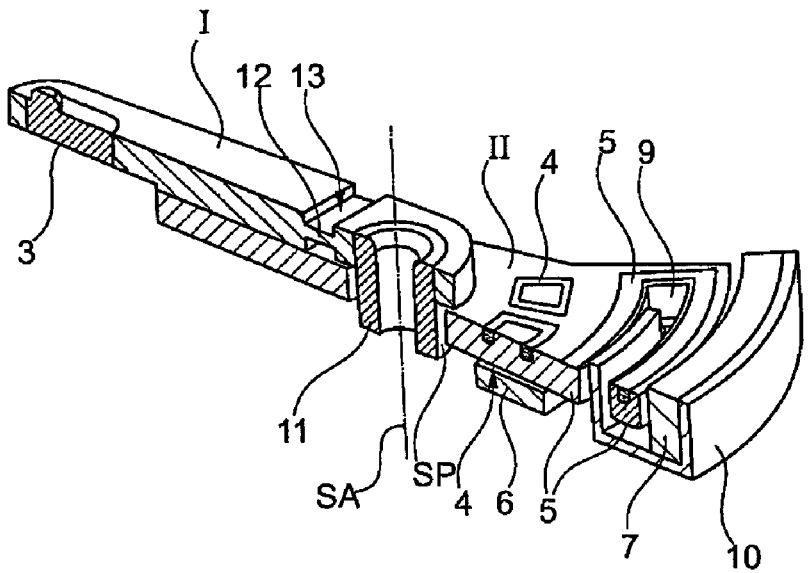
FIG. 2 is a longitudinal sectional view of the suspension arm actuator.

FIG. 2 shows, in particular, the design and arrangement of the coils 4 and 5 as well as of the related magnets 6 and 7 and the freely suspended arrangement of the lever arm II which is characterized by a play SP in relation to the bearing bush 11. The coils 4 are each formed of four copper, Cu, layers 4.1 to 4.4, while the coil 5 is formed of five Cu layers 5.1 to 5.5; said coils 4 and 5 are embedded in the plastic material of the suspension arm 1, so that these coils 4, 5 end flush with the surface thereof.

Figure 3:
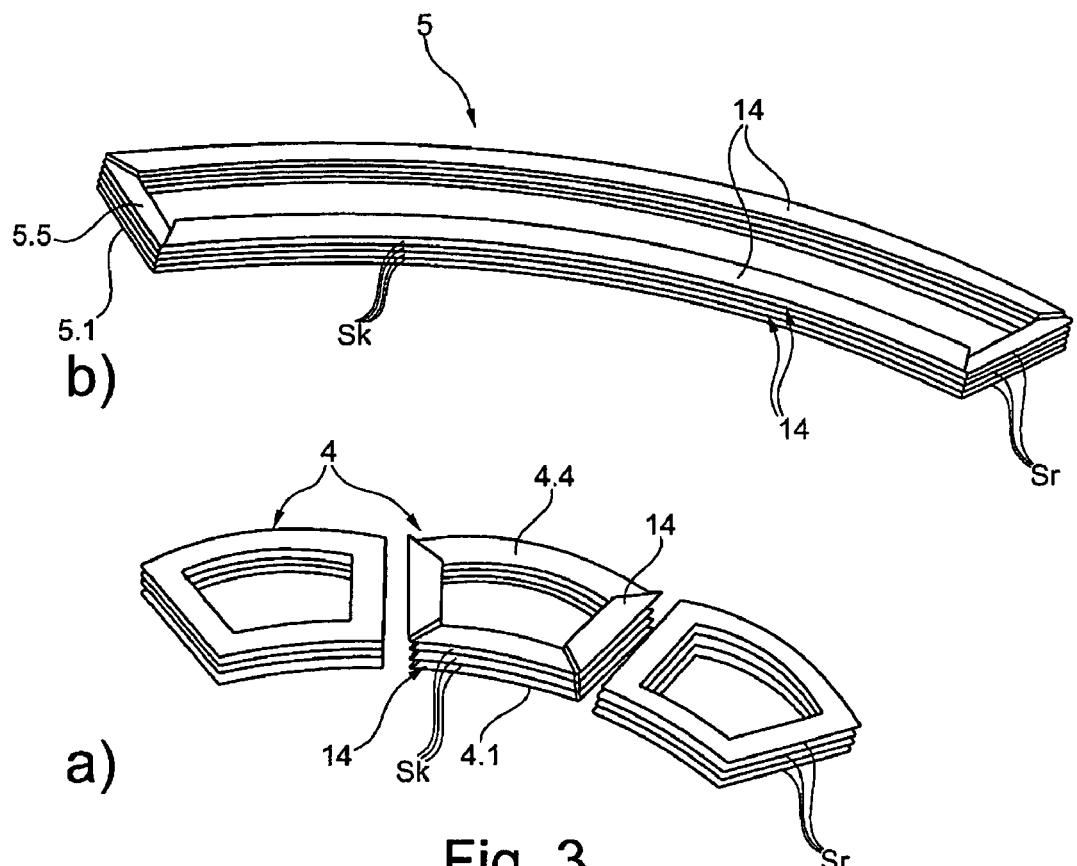
FIG. 3a shows a tracking coil.
FIG. 3b shows a focus coil.

FIGS. 3a and 3b show the multi-layer coils 4 and 5 each in detail. The central coil 4 shown in FIG. 3a is provided with ferrite layers 14 between the layers 4.1 to 4.4 and ends on its upper side with such a ferrite layer 14, said ferrite layers 14 increasing the magnetic field strength. Therein, the ferrite layers 14 are each positioned between the layers in the radially aligned phase windings Sr. The magnetic field strength of the coil 5 is also increased by means of ferrite layers 14. In said coil 5, the ferrite layers are arranged in the coaxially curved phase windings Sk. The coils 4 and 5 formed in this manner allow to noticeably increase the sensitivity of the suspension arm actuator in either direction f, t. For example, a plurality of multi-layer coils 4 that are arranged adjacent to each other and increase the magnetic field strength allow an increase in sensitivity in tracking direction t by far more than 50 percent.

FIG. 4 shows the arrangement and mounting of the suspension arm 1 to a support 2. A pivot pin 15 is permanently arranged on said support 2, with the suspension arm 1 being pivoted to said pivot pin 15 with the bearing bush 11. The optical disk OP allocated to the suspension arm 1 and the optical head 3 thereof is positioned in a parallel arrangement thereto. A swivel motion of the suspension arm 1 about the pivot axis SA initiates a motion of the optical head 3 radially in relation to the disk OP, in tracking direction t, FIG. 1. The focusing of a specific point on the disk OP is enabled by a motion of the lever arm II and, thus, the optical head 3 in focusing direction f perpendicularly to the tracking direction t.

The invention claimed is:

1. A suspension arm actuator for a scanning device, comprising:
    a suspension arm designed as a lever, said suspension arm supporting a scanning head and being mounted to a support such that it is pivotable about an axis extending perpendicularly to the lever, and
    a magnetic drive for initiating a motion of the scanning head, wherein
    the magnetic drive is designed with at least one printed coil comprising a plurality of plane layers, between which layers is provided at least one layer formed of a ferromagnetic material for increasing the magnetic field strength of the printed coil.

2. The suspension arm actuator according to claim 1, wherein a layer formed of a ferromagnetic material for increasing the magnetic field strength is arranged between each of the plurality of plane layers.

3. The suspension arm actuator according to claim 2, wherein the coil of the magnetic drive has an increased magnetic field strength initiating the swivel motion about the axis as a tracking coil.

4. The suspension arm actuator according to claim 3, wherein the tracking coil of the magnetic drive for initiating the tracking motion comprises two phase windings extending radially in relation to the pivot axis and two phase windings extending coaxially in relation to the pivot axis and that the radially aligned phase windings have an increased magnetic field strength.

5. The suspension arm actuator according to claim 4, wherein a plurality of tracking coils are arranged adjacent to each other and coaxially in relation to the pivot axis.

6. The suspension arm actuator according to claim 1, wherein a ferrite is used as ferromagnetic material.

7. The suspension arm actuator according to claim 2, wherein the coil having an increased magnetic field strength is embedded in the material of the suspension arm.

8. The suspension arm actuator according to claim 6, wherein the lever is designed as a two-arm lever which is mounted to the support such that it is pivotable between the lever arms and that the scanning head is an optical head having a focal lens, wherein one of the lever arms supports on its end side the optical head for initiating a motion of the optical head in a focusing direction perpendicularly to the pivot plane, and wherein the second lever arm comprises the tracking coil.

9. The suspension arm actuator according to claim 8, wherein the lever comprises a coil of a magnetic drive for initiating a motion of the optical head in a focusing direction, wherein the coil for initiating the focusing motion is also designed as a printed coil with a layer increasing the magnetic field strength, and wherein the magnetic drive for initiating the motion of the optical head in the focusing direction is allocated to the lever arm that comprises the tracking coil.

10. The suspension arm actuator according to claim 8, wherein the lever arm supporting the optical head is connected non-rotatably to a bearing element which enables a swivel motion about the axis and that, in the region between the optical head and the elastically bendable region of the lever arm, the lever arm is securely connected to this lever arm and freely suspended on that side of the region that is facing away from the optical head.

11. The suspension arm actuator according to claim 10, wherein the bendable region is a region that is reduced in thickness or perforated as seen from a longitudinal sectional view of the lever arm.

12. The suspension arm actuator according to claim 9, wherein, as seen from the top view of the suspension arm, the coil responsible for the focusing direction surrounds a recess having the shape of a circular arc and being formed in the end region of the second lever arm, said recess being intended for a leg of a yoke that is U-shaped in cross-section, and that the curved phase windings of the focus coil are provided with at least one layer increasing the magnetic field strength.

* * * * *